L. B. JAMES.
INK WELL.
APPLICATION FILED APR. 13, 1916.
1,218,663.
Patented Mar. 13, 1917.
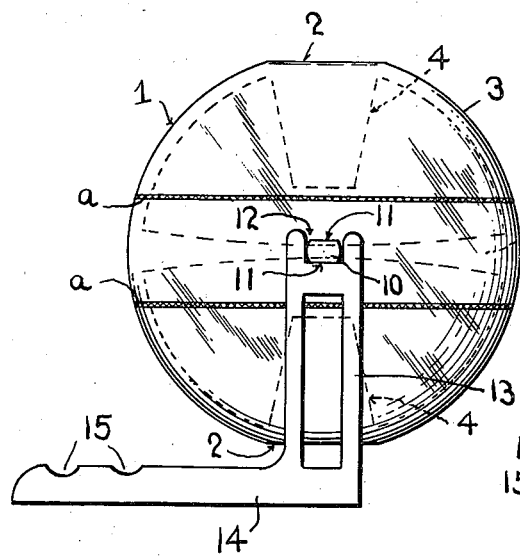
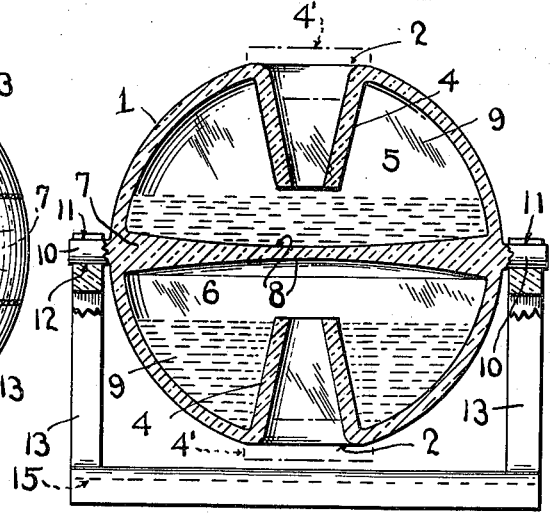
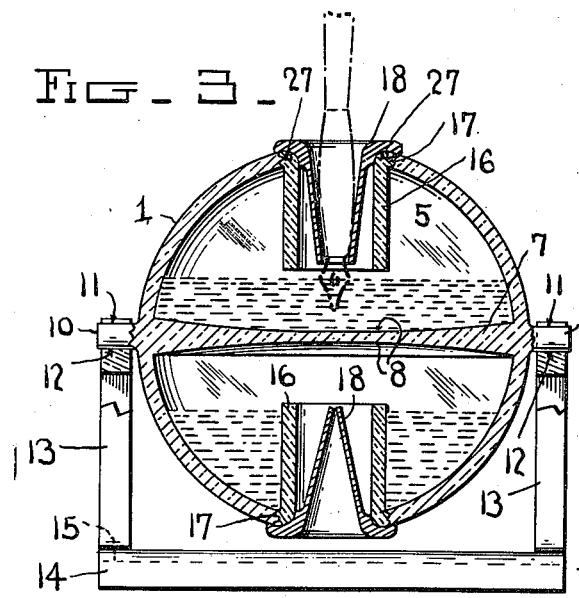
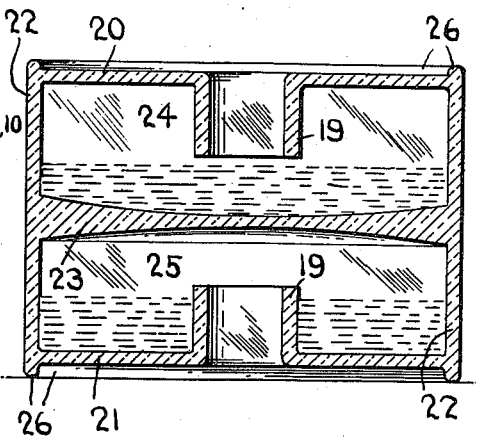
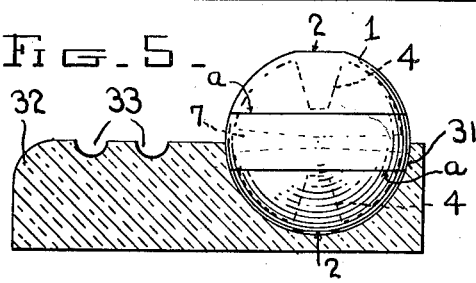
Inventor
Lynwood B. James
By
Attorney

UNITED STATES PATENT OFFICE.

LYNWOOD B. JAMES, OF WASHINGTON, DISTRICT OF COLUMBIA.

INK-WELL.

1,218,663. Specification of Letters Patent. Patented Mar. 13, 1917.

Application filed April 13, 1916. Serial No. 90,932.

*To all whom it may concern:*

Be it known that I, LYNWOOD B. JAMES, a citizen of the United States, residing at Washington, in the District of Columbia, have invented certain new and useful Improvements in Ink-Wells, of which the following is a specification.

This invention relates to improvements in ink wells.
The object of the invention is to provide a simple well in which inks of different colors may be contained, for instance, black and red ink, the one in no way interfering with the other in use, the arrangement being such that when say for instance black ink is being used, the red or other colored ink not wanted for immediate use, will be contained in another part of the well, but so held therein that by merely reversing the reservoir, or turning it upsidedown, the red ink will be brought to position for convenient use, while the black ink will flow to a position in the well, like that occupied by the other. In other words, it being merely necessary to reverse the reservoir in order to use first one ink and then the other.

A further object is to so construct the reservoir as to eliminate the possibility of the ink flowing from the well in the reversing operation.

Other objects and advantages will become apparent from the following description, and the points of novelty will be set forth in the claims.
The invention consists in the main, broadly stated, of a body of suitable shape having therein a partition or division wall which separates the interior of the body into a plurality of ink containing compartments, which are entirely independent of each other, there being a sleeve or bushing surrounding the pen receiving aperture, which determines the amount of ink which may be contained in the compartments, the whole device being adapted to be reversed or turned upsidedown, to make accessible one or the other compartment, as the exigencies of the case may require.

In the drawing illustrating the invention—

Figure 1 is a side elevation of the well, mounted upon a suitable stand, which may serve both as a support for the well, and a pen rack.

Fig. 2 is a vertical cross section of the well, the supporting arms of the base or support being broken away to show the manner of supporting the trunnions of the well.

Fig. 3 is a view like Fig. 2 showing the bushing surrounding the pen receiving aperture separate from the main body of the well, and having therein an additional bushing of rubber or other suitable material, designed to prevent undue evaporation of the contents of the well.

Fig. 4 is a central vertical sectional view of a modified form of well, which may be either circular in horizontal cross section or rectangular, as desired, and Fig. 5 is a view showing another manner of supporting the well the base or support being in section.

Referring to the drawings, the numeral 1 designates the body of the well preferably spherical or globe-like in form, provided with flattened portions 2 at opposite sides, which sides may be, as will presently appear, either the top or bottom of the well. Integral with the outer wall 3 are two sleeves 4, which extend into compartments 5 and 6, which compartments are formed by a transverse partition 7 slightly concaved on both sides as indicated at 8. The sleeves 4 extend considerably within the compartments, thus forming with a portion of the wall of the well, circular pockets 9, the depth of which determines the amount of ink to be placed in the well, as shown in Figs. 2 and 3, and it will be noted that when the well is in position to use the ink in the upper compartment, the ink will occupy the upper space shown in Figs. 2 and 3, and the other ink, say for instance, the red ink, not desired for common use, will occupy the position shown in the lower compartment in Figs. 2 and 3.

The top is provided at opposite sides with trunnions which are flattened as indicated at 11, which flattened portions are received in a recess 12 in each arm 13 of the base or support 14, which base, as shown, may be provided with a plurality of grooves 15, for the reception of pens or the like.

In Fig. 3 is shown sleeves 16 which are threaded into the body at 17, and I may provide a member like 18, generally conical in shape, and made of rubber or other soft material and of such size and elasticity as to be opened automatically by the insertion of pen in dipping the pen, and to close in similar manner when the pen is withdrawn to prevent undue evaporation.

In Fig. 4 there is illustrated a well of different contour which may be either rectangular in shape or circular in horizontal cross-section, but in this form, as in the forms heretofore described, the well is provided with the pen receiving apertures, surrounded by sleeves 19 which are integral with the top and bottom walls 20 and 21, which in turn are integral with the outer continuous wall 22, there being provided centrally, a double concaved horizontal partition 23, which divides the well into compartments 24 and 25, one being for one kind of ink and the other for another kind. I preferably provide around the upper and lower edges of the well, a bead 26, which obviously raises the walls 20 and 21 slightly above the base or support for the well. By this arrangement, it will be noted that when the well is on a flat surface, for which it is designed, as for instance a cut out or recessed portion, in a suitable stand, the lower bead will serve as a seal for the lower compartment, thus preventing evaporation of the ink not in use.

In operation, taking for instance, the form shown in Figs. 1, 2 and 3, and assuming that in the position shown, the ink in the now upper portion of the well is black, and it is desired to have access to the ink in the now lower compartment, which may be the red ink, it is only necessary to slowly revolve the body, turning it upon its trunnions 10, until the body is completely reversed. During this movement the black ink will follow the inner wall of the upper compartment gradually finding its way to the pockets 9, whereas, the red ink, in the lower compartment, will be brought to the position now occupied by the black ink or in proper position below the pen receiving aperture. The partitions 7 and 23 are intentionally concaved on both sides, so as to cause the ink to flow off to the sides toward the walls of the body, and prevent the possibility of drops accumulating above the lower pen receiving aperture in the operation of reversing the well.

It is to be understood that the well may be made in any suitable shape, and while I have shown two compartments, which would ordinarily be all that would be required, a greater number may be provided.

In the forms shown in Figs. 1, 2 and 3, the well is merely reversed or rocked, whereas in the form shown in Fig. 4, the same general movement takes place, but the reversing operation is brought about by slow lifting and turning over of the well.

The numeral 27 designates two spanner holes in the sleeve 16, by which said sleeve may be readily removed for draining the well, or for cleaning purposes, when desired.

In the modification shown in Fig. 5, I dispense with the trunnions and seat the well in a hemispherical socket 31, made in a base 32, which is preferably provided with a plurality of pen holding grooves 33. In this form it will be noted that when the spherical well is in the socket or pocket, the lower pen receiving orifice is closed, thus preventing evaporation.

I prefer to make the sleeves 4 as shown in Figs. 1, 2 and 5, conical in shape, as obviously this increases the capacity of the pockets formed between the wall of the sleeves and the wall of the well, and there may be provided, as indicated in dotted lines at 4' in Fig. 2, stoppers of any approved construction.

It will be noted that the depth of the ink in the compartments is determined by the length of the sleeve, it being obvious that in filling the well, the ink must not come quite up to the lower edge of the upper sleeve and so as to make certain the extent to which the well is to be filled, I preferably provide the well with two ribs or markings a—a, shown in Fig. 1.

Having thus fully described my invention, what I claim is:—

1. An ink well comprising a hollow body having a plurality of ink containing compartments therein, a pen receiving orifice communicating with each compartment, and means surrounding the orifice and extending into the compartments and forming with the walls of the body, means for retaining ink within the compartments, the body being adapted to be reversed to bring the ink in either compartment below the mouth of the orifice, in position for use.

2. An ink well comprising a reversible hollow body having a partition therein dividing it into compartments, a sleeve projecting into each compartment and having a pen receiving orifice therein, the sleeves together with the wall of the body, forming means to prevent the ink from spilling out of the pen orifices when the body is reversed.

3. An ink well comprising a hollow body having a partition therein dividing the body into interior compartments, two oppositely disposed sleeves extending into the compartments and having therethrough pen receiving orifices, the sleeves, together with the wall of the well serving as means for retaining ink in the well and preventing it from spilling through the orifices when the body is reversed.

4. In an ink well, the combination with a suitable support, a hollow reversible body having trunnions having bearings in the support, said body being provided with a central partition dividing the body into compartments, oppositely disposed sleeves extending into said compartments each having a pen receiving orifice therein, the walls of the said sleeves, together with the wall of the body, serving as means for retaining the ink in the receptacle and preventing the same from spilling through the orifices when the body is being reversed.

5. An ink well comprising a hollow reversible body having a partition therein dividing it into ink containing compartments, oppositely disposed conical sleeves extending into the compartments, and having therethrough pen receiving orifices, the wall of the sleeve, together with the wall of the body, serving to prevent spilling of the ink through said orifices, while the well is being reversed.

6. An ink well comprising a hollow reversible body having pen receiving orifices disposed on opposite sides, a partition in said body dividing it into interior compartments, and means for retaining ink within said compartments when the body is inverted.

7. An ink well comprising a hollow reversible body having pen receiving orifices disposed on opposite sides, a partition in said body dividing it into interior compartments, a hollow extension projecting into each compartment, which extension, together with the wall of the body, forms a pocket to retain the ink in the lower part of said body.

8. A reversible ink-well having a plurality of non-communicating compartments, each having an inlet, the inlets being so related that when one faces upwardly the other faces downwardly, and means to prevent escape of the inks during the reversal, and when either inlet is in pen-receiving position.

9. A reversible ink-well comprising a body having two compartments, each having an inlet, the inlets facing in opposite directions, and means to retain the inks in the compartments during reversal, and when either is in pen-receiving position, said compartments being so related that the level of the ink in the upper compartment is always above the level of the ink in the other compartment.

In testimony whereof I affix my signature in presence of two witnesses.

LYNWOOD B. JAMES.

Witnesses:
FRANK G. BRONTON,
F. T. F. JOHNSON.